Nov. 6, 1962     V. J. CARTER     3,062,512
PROPORTIONAL MEASURING AND MIXING DEVICE FOR FLUIDS
Filed Oct. 29, 1959
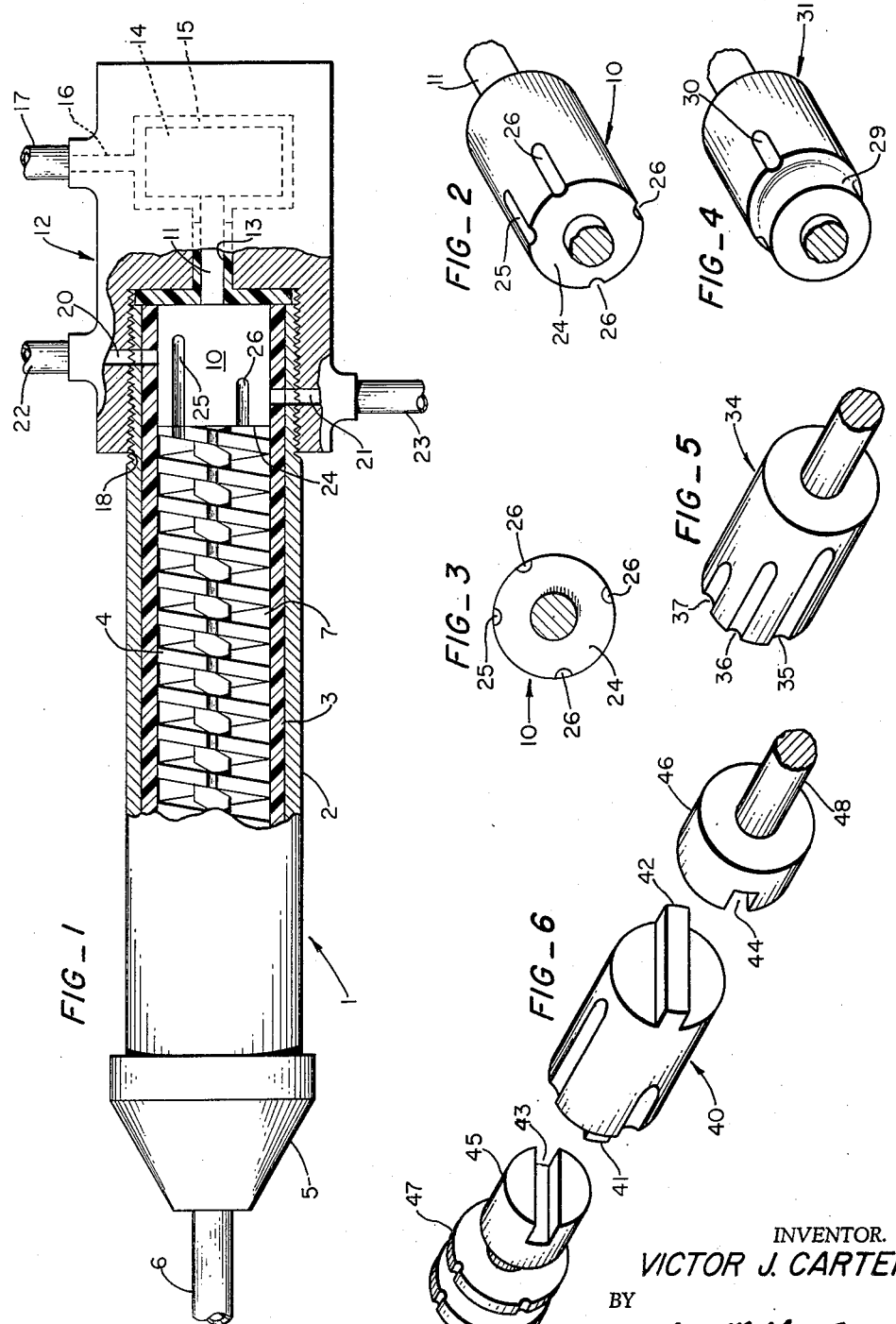
INVENTOR.
VICTOR J. CARTER
BY
Boyken, Mohler + Wood
ATTORNEYS United States Patent Office 3,062,512
Patented Nov. 6, 1962

3,062,512
PROPORTIONAL MEASURING AND MIXING
DEVICE FOR FLUIDS
Victor J. Carter, San Francisco, Calif., assignor to
George A. Jarrett
Filed Oct. 29, 1959, Ser. No. 849,692
7 Claims. (Cl. 259—25)

This invention relates to a device for proportionately measuring quantities of two or more fluids. More particularly the invention is directed to means for mixing two or more fluids in predetermined quantity ratios in a simple and accurate manner.

The invention will be illustrated by showing its application to a mixing device such as that disclosed in my patent application Serial No. 765,369, filed October 6, 1958, but it will be understood that the invention lends itself to use in other devices.

It is frequently necessary to conduct fluids in predetermined quantities or proportions during an interval of time. One example of the need for accurately proportioning fluids arises in mixing devices of the type disclosed in the above noted pending application. However, it will be understood that a metering or measuring function may be performed by the present invention in the absence of the mixing function.

Certain valves heretofore used for proportioning fluids to be mixed, such as metering valves, have been found to have the disadvantage of discharging different proportions of fluid depending upon the pressures of such fluids.

The main object of the present invention is therefore the provision of a metering device for fluids which lends itself to very accurate quantity measurement of such fluids regardless of pressure and is particularly adapted for use in mixing fluids in a desired ratio.

Other objects and advantages will be apparent from the following specification and from the drawings.

FIG. 1 is a side elevation of a mixing device for fluids showing the invention applied thereto and with portions broken away and in section to show internal structure.

FIG. 2 is a fragmentary perspective of one form of the mixing element of the invention.

FIG. 3 is an end elevation of the mixing element of FIG. 2.

FIG. 4 is a perspective of a modified form of proportioning element.

FIG. 5 is a perspective of another form of proportioning element.

FIG. 6 is an exploded view of a modified form of mixing element showing the same as used with the agitating device and drive shaft.

In detail, and with reference first to FIG. 1 the invention is adapted to be employed with a mixing device generally designated 1 similar to that disclosed in application Serial No. 765,369. Said device 1 comprises a hollow cylindrical housing 2 and preferably including an inner cylindrical sleeve 3 of wear resistant plastic such as Teflon defining a mixing chamber 7. Rotatably supported in said sleeve 3 is a screw 4 which is constructed so as to mix the fluids contained therein and to discharge the mixture out of the discharge end 5 and into a discharge conduit 6 or a nozzle depending on the use to which the mixture is to be put.

As shown in FIG. 1 the screw 4 is integrally secured at its end opposite the discharge end to a proportioning device generally designated 10 which in turn is connected to a driving shaft 11. Preferably a second housing 12 is provided having a bore 13 is which shaft 11 is rotatable. A rotor 14 is secured to shaft 11 and housing 12 is formed to provide a chamber 15 to which air is conducted through a passageway 16 from a source of air 17. By this structure a conventional air motor may be provided for rotating shaft 11 and, with it, proportioning device 10 and screw 4.

Cylindrical housing 2 is screwthreadedly fixed to housing 12 by screw threads 18 and a washer of Teflon or the like may be interposed between the end housing 2 and the housing 12.

A radial bore 20 is formed through housing 12, the sidewall of cylinder 2 and sleeve 3 so as to provide a port opening radially inward against the periphery of the proportioning device 10.

Another similar bore 21 is formed at a point axially and circumferentially spaced from bore 20 and at a point nearer the screw 4. Bores 20, 21 are respectively connected to conduits 22, 23 which in turn are connected to sources of fluid under pressure. It will be understood later on that three or more fluids may be supplied to the device but the used of two fluids adequately illustrates the apparatus employed.

The periphery of the proportioning device of FIGS. 1–3 is provided with three circumferentially spaced axially extending grooves or passageways 26 which extend from the axially directed end 24 of element 10 to a point at which they are in communication with bore 21 when the element 10 is rotated. Another somewhat longer passageway 25 is provided on element 10 so that it communicates with bore 20 when element 10 is rotated.

By the above described structure it will be apparent, assuming two different fluids being applied under pressure to bores 20, 21 from conduits 22, 23, that said fluids will be transmitted to the mixing chamber 7 in the ratio of four to one. That is, four parts of the fluid from conduit 23 and one part of the fluid from conduit 22 will be conveyed to mixing chamber 7. Obviously, if only one passageway 26 were provided the ratio of the fluids would be two to one; and if two passageways 26 were provided the fluids would be transmitted to mixing chamber 7 in the proportion of three to one. It will further be apparent that the invention contemplates the provision of, say, two passageways 25 and three passageways 26, for example, giving a ratio of five to two.

The invention further contemplates proportioning the fluids by varying the effective area of passageways 26. For example, by making the area of passageway 26 equal to three-quarters the area of passageway 25 a ratio of three and one-quarter to one may be effected, and so on.

If the required ratio between the fluids is very high, say ten to one for example, it is desirable to permit port 21 to communicate with mixing chamber 7 at all times and to permit port 20 to communicate only intermittently. This result may be accomplished by the proportioning device of FIG. 4 wherein the passageway 29 extends around the circumference of the proportioning element 31 while the circumferential extent of passageway 30 extends for only a fraction, say one-tenth, of the periphery.

As specifically applied to the device for converting epoxy resin plastics which is set forth in application Serial No. 765,369 the present invention is particularly effective. The main reason being that not only are the exact desired proportions readily attainable but, in addition, the resin and catalyst are partially mixed before reaching the mixing chamber 7 because of the intermittent feeding of one fluid and then the other. In other words, the materials to be mixed are not combined in separate layers, but rather are sandwiched between each other so that less actual mixing of the materials is required to be done by the screw 4.

Another advantage of the above described proportioning device as applied to converting epoxies resides in the fact that the device may be readily cleaned by running solvent through one of the passageways provided in the proportioning element. For example, in the element 34 of FIG. 5 passageway 35 may be employed for resin, passageway 36 for catalyst and passageway 37 for cleaner. It will be understood of course that each passageway has a corresponding port and a supply conduit for fluid connected thereto. The port 37 would normally be closed during use and opened only after the flow to passageways 35, 36 has been shut off.

It will be appreciated that the flow of solvent through chamber 7 while the screw 4 is rotating is effective to clean out the plastic entirely. This is essential to operation of the epoxy converter because it is a characteristic of the resin that it hardens quickly under the influence of the catalyst. It will also be apparent that the resin and catalyst remaining in passageways 35, 36 will not be adversely affected since there is no tendency for the resin to harden unless mixed with the catalyst.

The proportioning element of FIG. 5 may obviously be employed to proportion three fluids if desired.

To adapt the device to mixing fluids in different proportions it is desirable in some instances to make the proportioning element removable from the driving shaft. This may be done through the structure shown in FIG. 6 wherein the proportioning element 40 is provided with diametrally extending ridges 41, 42 which are received within complementarily formed grooves 43, 44 on hubs 45, 46 respectively. Said hubs 45, 46 are in turn integrally formed on screw 47 and drive shaft 48 respectively. The hub 45 should of course be somewhat less in diameter than proportioning element 40 to permit the fluids to enter the mixing chamber.

The construction of FIG. 6 also facilitates cleaning the device when it is disassembled as does the provision of the Teflon sleeve 3.

It is preferable that the passageways in the proportioning device be in staggered relationship relative to the ports with which they communicate so that two passageways are not receiving fluid at the same time. In this manner the effects of back pressure from the materials in the device are minimized. For example, as seen in FIG. 3 the passageway 26 nearest passageway 25 is preferably offset about 60° from the latter and not 90°.

The above detailed description of the preferred forms of invention is not to be taken as restrictive of the invention as it is obvious that various modifications in design may be resorted to without departing from the invention as defined in the following claims.

I claim:
1. A proportional measuring device for a plurality of fluids comprising: first and second conduits for conveying two different fluids respectively under pressure, a housing having an inner cylindrical sidewall, a cylindrical proportioning element received in said housing in rotatable slidable engagement with said sidewall means for rotating said element, first and second longitudinally extending passageways formed in the periphery of said element and terminating at one axially directed end of said element, said second passageway extending a greater distance along said element from said one end than said first passageway, a first port formed in said housing and connected to said first conduit and in communication with said first and second passageways successively upon rotation of said element, a second port formed in said housing and connected to said second conduit and in communication with said second passageway only upon such rotation.

2. A proportional measuring device for a plurality of fluids comprising: first and second conduits for conveying two different fluids respectively under pressure, a housing having an inner cylindrical sidewall, a cylindrical proportioning element received in said housing in rotatable slidable engagement with said sidewall, means for rotating said element, first and second longitudinally extending passageways formed in the periphery of said element and terminating at one axially directed end of said element, said second passageway extending a greater distance along said element from said one end than said first passageway, a first port formed in said housing and connected to said first conduit and in communication with said first and second passageways successively upon rotation of said element, a second port formed in said housing and connected to said second conduit and in communication with said second passageway only upon such rotation, said first and second ports being circumferentially spaced apart whereby said ports communicate with said passageways at different times during said rotation.

3. A mixing device for mixing a plurality of fluids in predetermined proportions comprising: a housing having an inner cylindrical sidewall defining a mixing chamber, a cylindrical proportioning element received in said housing and in rotatable sliding engagement with said sidewall, means for rotating said element, first and second longitudinally extending passageways formed in the periphery of said element and terminating at one axially directed end of said element for discharging fluid from said passageways into said chamber, said second passageway extending a greater distance along said element from said one end than said first passageway, a first port formed in said housing and adapted to be connected to a first conduit and in communication with said first and second passageways successively upon rotation of said element, a second port formed in said housing and adapted to be connected to a second conduit and in communication with said second passageway only upon said rotation.

4. A proportional measuring and mixing device for a plurality of fluids comprising: first and second conduits for conveying two different fluids respectively under pressure, a housing having an inner cylindrical sidewall, defining a mixing chamber a cylindrical proportioning element received in said housing in rotatable slidable engagement with said sidewall, means for rotating said element, first and second longitudinally extending passageways formed in the periphery of said element and terminating at one axially directed end of said element, said second passageway extending a greater distance along said element from said one end than said first passageway, a first port formed in said housing and connected to said first conduit and in communication with said first and second passageways successively upon rotation of said element, a second port formed in said housing and connected to said second conduit and in communication with said second passageway only upon such rotation, a shaft connected with said element for rotating the same and extending into said mixing chamber and provided with means for mixing the fluids in said chamber.

5. A proportional measuring device for a plurality of fluids comprising: first and second conduits for conveying two different fluids respectively under pressure, a housing having an inner cylindrical sidewall, a cylindrical proportioning element received in said housing in rotatable slidable engagement with said sidewall, means for rotating said element, first and second longitudinally extending passageways formed in the periphery of said element and terminating at one axially directed end of said element, said second passageway extending a greater distance along said element from said one end than said first passageway, a first port formed in said housing and connected to said first conduit and in communication with said first and second passageways successively upon rotation of said element, a second port formed in said housing and connected to said second conduit and in communication with said second passageway only upon such rotation, and a third passageway formed in the periphery of said element and extending axially from said axially directed end to a point spaced from said end a greater distance than said second passageway, a third port connected to a third conduit and in communication with said third passageway only upon rotation of said element.

6. A proportional measuring and mixing device for a plurality of fluids comprising: first and second conduits for conveying two different fluids respectively under pressure, a housing having an inner cylindrical sidewall, defining a mixing chamber a cylindrical proportioning element received in said housing in rotatable slidable engagement with said sidewall, means for rotating said element, first and second longitudinally extending passageways formed in the periphery of said element and terminating at one axially directed end of said element, said second passageway extending a greater distance along said element from said one end than said first passageway, a first port formed in said housing and connected to said first conduit and in communication with said first and second passageways successively upon rotation of said elements, a second port formed in said housing and connected to said second conduit and in communication with said second passageway only upon such rotation, a shaft connected with said element for rotating the same and extending into said mixing chamber and provided with means for mixing the fluids in said chamber, said proportioning element being detachably secured to said shaft to permit substitution of different elements on said shaft.

7. A proportional measuring device for a plurality of fluids comprising: first and second conduits for conveying two different fluids respectively under pressure, a housing having an inner cylindrical sidewall, a cylindrical proportioning element received in said housing in rotatable slideable engagement with said sidewall, means for rotating said element, the diameter of said element being reduced at one axially directed end of said element to provide a first passageway extending around the periphery of said element, a second passageway formed on the periphery of said element and extending axially along the same away from said one end and in communication with said first passageway, a first port formed in said housing and connected to said first conduit and in communication with said first passageway, a second port formed in said housing and connected to said second conduit and in intermittent communication with said second passageway at a point spaced from said first passageway upon such rotation.

References Cited in the file of this patent

UNITED STATES PATENTS

| | | |
|---|---|---|
| 1,753,730 | Tuller | Apr. 8, 1930 |
| 2,145,383 | Alden | Jan. 31, 1939 |
| 2,447,423 | Nies | Aug. 17, 1948 |
| 2,670,187 | Goodrich | Feb. 23, 1954 |
| 2,687,234 | McLauchlan et al. | Aug. 24, 1954 |
| 2,868,518 | Corby et al. | Jan. 13, 1959 |